(12) United States Patent
Bonham et al.

(10) Patent No.: US 7,890,339 B2
(45) Date of Patent: *Feb. 15, 2011

(54) SURFACE OWNERSHIP DATA MANAGEMENT SYSTEM

(75) Inventors: Joe R. Bonham, Skiatook, OK (US); Danny L. Williams, Bartlesville, OK (US); Alan B. Cowart, Kingwood, TX (US); Jeffrey W. Bute, Pawhuska, OK (US)

(73) Assignee: ConocoPhillips Company, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 12/719,280

(22) Filed: Mar. 8, 2010

(65) Prior Publication Data

US 2010/0161501 A1    Jun. 24, 2010

Related U.S. Application Data

(63) Continuation of application No. 10/900,755, filed on Jul. 28, 2004, now Pat. No. 7,707,041.

(51) Int. Cl.
*G06Q 10/00* (2006.01)

(52) U.S. Cl. ........................................................ 705/1.1
(58) Field of Classification Search .................. 705/1.1
See application file for complete search history.

(56) References Cited

U.S. PATENT DOCUMENTS

| 5,032,989 | A | 7/1991 | Tornetta |
| 6,609,090 | B1 | 8/2003 | Hickman et al. |
| 6,636,803 | B1 | 10/2003 | Hartz |
| 6,681,231 | B1 | 1/2004 | Burnett |
| 7,389,242 | B2 | 6/2008 | Frost |
| 2002/0016757 | A1 | 2/2002 | Johnson et al. |
| 2002/0032626 | A1 | 3/2002 | DeWolf et al. |
| 2002/0198736 | A1 | 12/2002 | Harrison |
| 2003/0023412 | A1 | 1/2003 | Rappaport et al. |
| 2003/0140064 | A1 | 7/2003 | Klein |

OTHER PUBLICATIONS

Information on Tobin Solutions, 2003, www.tobin.com, printed through www.archive.com, data is in the URL in YYYYMMDD format.
Information on Realtor Workstation, 2000. T-III MLS Software.

*Primary Examiner*—Naresh Vig

(57) ABSTRACT

A system, method and computer program relate to gathering and managing ownership data for properties in a geographic area on which an asset, such as a pipeline is located.

20 Claims, 7 Drawing Sheets

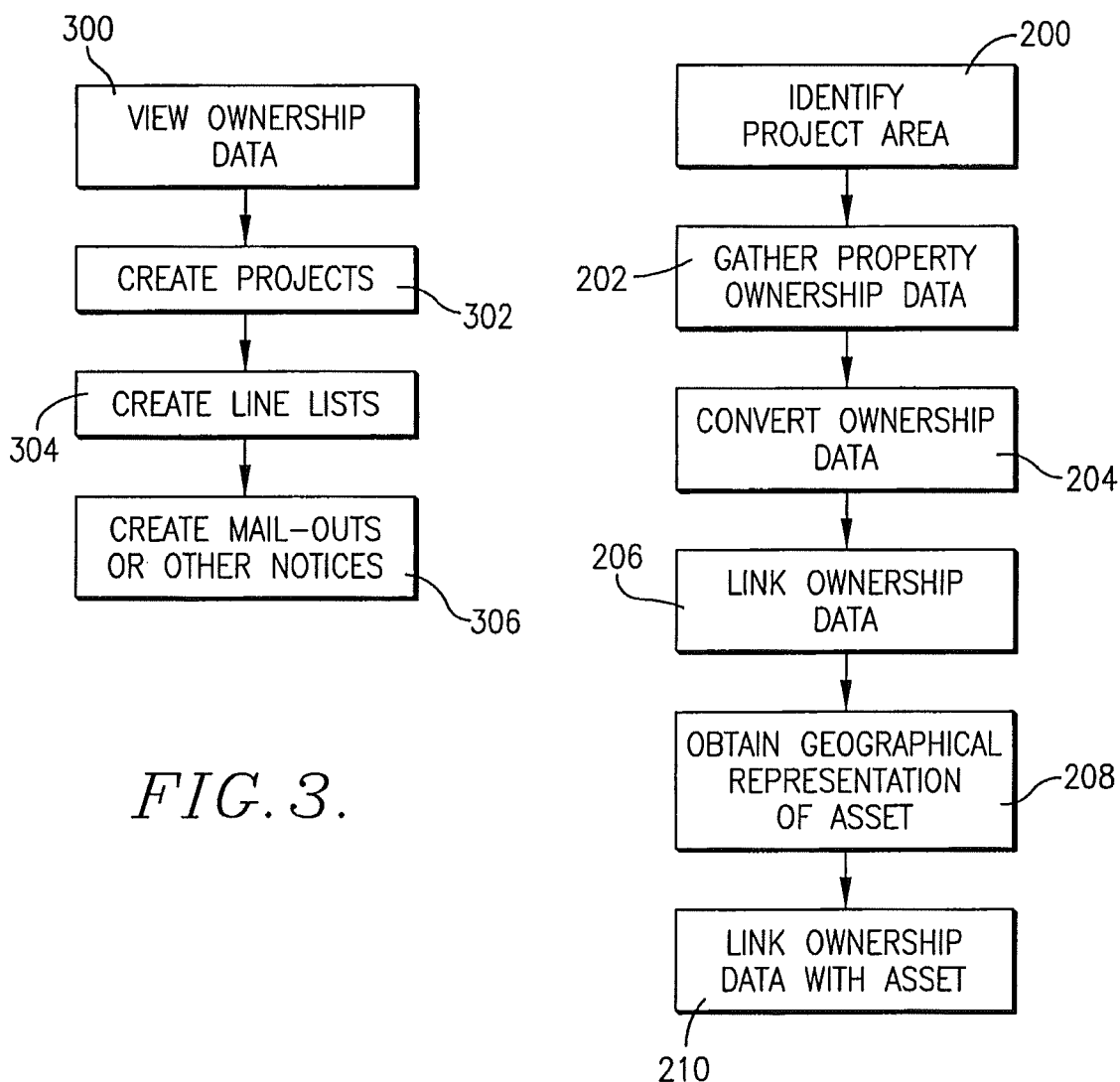

SURFACE OWNERSHIP DATA MANAGEMENT SYSTEM

CROSS-REFERENCE TO RELATED APPLICATIONS

This application is a continuation application of U.S. application Ser. No. 10/900,755 filed Jul. 28, 2004, entitled "Surface Ownership Data Management System," which is incorporated herein in its entirety.

STATEMENT REGARDING FEDERALLY SPONSORED RESEARCH OR DEVELOPMENT

None.

FIELD OF THE INVENTION

The present invention relates to a surface ownership data management system. More particularly, the invention relates to a system, method, and computer program for gathering and managing surface ownership data for properties in a geographic area on which an asset, such as a pipeline, is located.

BACKGROUND OF THE INVENTION

Corporate and governmental entities often must gather and manage ownership information for properties so that owners of the properties can be periodically notified of events that may affect or relate to their properties. For example, petroleum companies own pipelines and related assets which pass through properties owned by other persons or entities. The petroleum companies therefore must obtain rights-of-way or easements to the properties to install, test and periodically maintain their pipelines. For example, brush often must be cleared from around the pipelines, thus necessitating access to the properties on which the pipelines are located.

Each time a petroleum company desires to enter properties on which its pipelines are located, or perform testing which may affect the properties, it must notify all affected property owners so that the owners are inconvenienced as little as possible. Those skilled in the art will appreciate that this can be a tremendous undertaking because some pipelines run through hundreds and even thousands of individual properties, especially in urban areas where land is often subdivided into many parcels and individual lots.

Current methods of gathering and maintaining ownership information for properties are very labor and time-intensive. A petroleum company that wishes to notify property owners of maintenance along a section of pipeline currently sends employees or agents to the courthouses of the counties through which the pipeline runs to manually search through deeds and other legal descriptions to identify all property owners that could be affected by the maintenance. The gathered information is then recorded by typing it into word processors, photocopying it, and/or manually handwriting the information onto sheets of paper. All of the gathered information must then be consolidated and typed into some other form, such as a word processing program so that it may be used to send notices to all the affected property owners. Such manual methods of gathering and recording ownership data are highly inefficient and prone to error because the information is typically entered two or three times before it is actually used to send out the notices.

Current manual methods of gathering and maintaining ownership data are also often over-inclusive because county records are not accurate enough to identify only those property owners through which a pipeline runs. In some cases, ownership information is gathered for an entire zip code because it is too difficult to identify only those properties within that zip code that are crossed by the pipeline. When notices are sent to every property owner within an entire zip code, many property owners are contacted unnecessarily, resulting in wasted efforts in gathering some of the ownership information and unnecessary mailing of notices to landowners who turn out to be unaffected by the maintenance.

Another limitation with current methods of gathering and maintaining ownership information is that once gathered and used for a specific purpose, the information is typically discarded because it is not organized and stored in a manner that facilitates re-use. Thus, when the same property owners need to be notified again, the information must be re-gathered.

BRIEF SUMMARY OF THE DISCLOSURE

It is, therefore, an object of the present invention to provide a system, method, and computer program for more effectively gathering and managing surface ownership data for properties in a geographic area on which an asset, such as a pipeline, is located.

Another object of the invention is to provide a system, method, and computer program for gathering and maintaining ownership data in such a manner that only property owners who are actually affected by an event, such as maintenance of a pipeline, are notified of the event.

Still another object of the present invention is to provide a system, method, and computer program for gathering and managing ownership data which permits the data to be used for multiple purposes without re-gathering the data.

Still another object of the present invention is to provide a system, method, and computer program for gathering and managing ownership data which permits the data to be gathered and stored in a more standardized format so that it may be used for many different applications by many different users.

Still another object of the present invention is to provide a system, method, and computer program for gathering and managing ownership data that is more intuitive and easy to use.

The above-listed objects are not all-inclusive and need not all be accomplished by the invention claimed herein. Further objects and advantages of the present invention will be apparent from the detailed description of the preferred embodiments of the invention, the claims, and the drawing figures.

In one embodiment of the present invention, a computer-implemented method for managing ownership data for properties in a geographic area on which an asset is located is provided. The method comprises the steps of: (a) gathering and storing in computer memory the ownership data; (b) obtaining a graphical representation of the asset; (c) linking the ownership data with the graphical representation of the asset; (d) displaying the graphical representation of the asset on a computer monitor; (e) permitting a user to select a portion of the graphical representation of the asset; and (f) in response to step (e), retrieving from the memory and displaying the ownership data associated with the selected portion of the graphical representation of the asset. The asset may be any device or thing that may require periodic maintenance, testing, or inspection. For example, the asset may be a pipeline or other facility owned and operated by a petroleum company.

In accordance with another embodiment of the invention, a computer-implemented method for managing ownership data is provided which comprises the steps of: (a) gathering and storing in computer memory textual ownership data; (b) gathering and storing in computer memory spatial ownership data; (c) linking the textual ownership data and the spatial ownership data; (d) obtaining a graphical representation of the asset; (e) obtaining a graphical representation of the geographic area on which the asset is located; (f) superimposing the graphical representation of the asset over the graphical representation of the geographic area to create a map of the asset; (g) linking the textual and spatial ownership data with the map of the asset; (h) displaying the map of the asset on a computer monitor; (i) permitting a user to select a portion of the map of the asset; and (j) in response to step (i), retrieving from the memory and displaying the textual and spatial ownership data associated with the selected portion of the map of the asset. As with the previous embodiment, the asset may be any device or thing such as a petroleum company pipeline.

In yet another embodiment of the present invention, a computer program for managing ownership data for properties in a geographic area on which an asset is located is provided. The computer program comprises: a code segment for receiving and storing in computer memory the ownership data; a code segment for receiving and storing a graphical representation of the asset; a code segment for linking the ownership data in the memory with the graphical representation of the asset; a code segment for displaying the graphical representation of the asset on a computer monitor; a code segment for monitoring selection of a portion of the graphical representation of the asset by a user; and a code segment for retrieving from the memory and displaying the ownership data associated with the selected portion of the graphical representation of the asset. The computer program may be a custom program designed specifically for these functions or may be a combination of currently-available programs combined and modified to perform the functions described herein.

In yet another embodiment of the present invention, a computer-implemented method for managing ownership data for properties in a geographic area on which an asset is located is provided. The method comprises the steps of: (a) gathering at least one aerial photograph of the geographic area; (b) gathering spatial ownership data concerning the asset located in the geographic area; (c) gathering textual ownership data concerning the asset and/or the properties in the geographic area; and (d) simultaneously displaying at least a portion of the aerial photograph, the spatial ownership data, and the textual ownership data on a computer monitor.

In yet another embodiment of the present invention, a computer-implemented method for managing ownership data for properties in a geographic area on which an asset is located is provided. The method comprises the steps of: (a) gathering and storing the ownership data in a master database; (b) downloading a portion of the ownership data from the master database to a portable computer; (c) using the portable computer to update the portion of the ownership data by obtaining more recent ownership data from owners of the properties or a governmental agency which maintains the ownership data; (d) synchronizing the updated ownership data in the portable computer with the ownership data stored in the master database so that the ownership data stored in the master database reflects the updated ownership data.

These and other important aspects of the present invention are described more fully in the detailed description below.

BRIEF DESCRIPTION OF THE DRAWINGS

A more complete understanding of the present invention and benefits thereof may be acquired by referring to the follow description taken in conjunction with the accompanying drawings in which:

FIG. 2 is a flow diagram depicting some of the steps that may be performed when implementing a preferred embodiment of the present invention.

FIG. 3 is a flow diagram depicting some of the functions or applications of the present invention.

DETAILED DESCRIPTION

Figure 1:
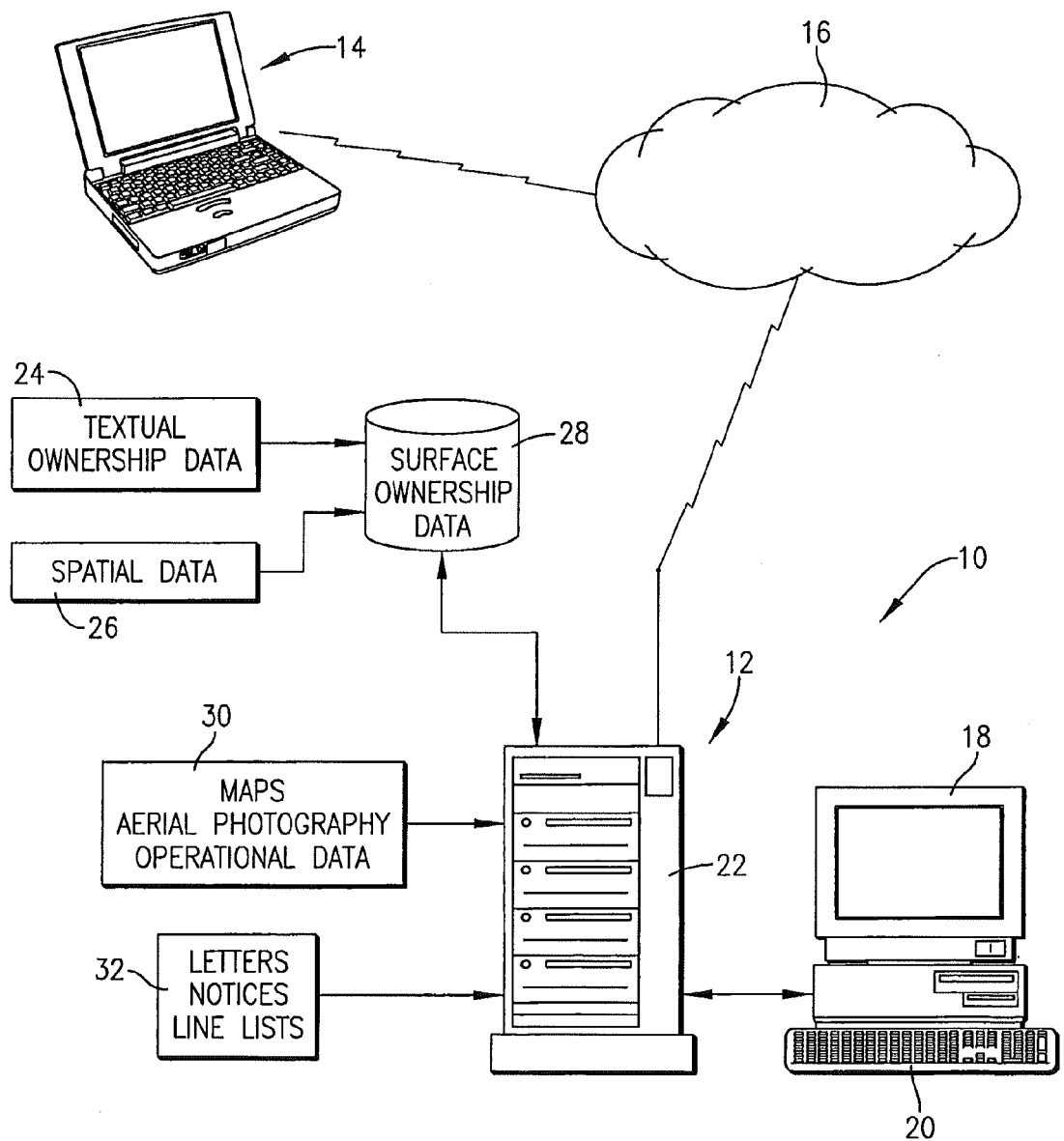
FIG. 1 is a schematic diagram of computer equipment and files which may be utilized to implement a preferred embodiment of the present invention.

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

The present invention can be implemented in hardware, software, firmware, or a combination thereof. In a preferred embodiment, however, the invention is implemented with a computer program or programs that operate computer equipment broadly referred to by the numeral 10 in FIG. 1.

In one embodiment, the present invention is implemented with several commercially available software programs including Microsoft Access, Microsoft Word, and Map Objects that are combined and customized to perform the steps described herein. One preferred application of these computer programs is to graphically represent certain assets, such as the pipelines and related facilities of a petroleum company, and to then tie these graphical representations back to a database or databases that contain ownership information for properties on which the assets are located. Applicants have discovered that linking such ownership data to graphical representations of related assets in the manner described herein provides a much simpler and more intuitive way to present the data to users.

An example of computer equipment 10 that may be used to implement preferred embodiments of the present invention includes a main computer 12 and at least one portable computing device 14 that may access the main computer 12 via a communications network 16. The computer program and equipment illustrated and described herein are merely examples of a program and equipment that may be used to implement the present invention and may be replaced with other software and computer equipment without departing from the scope of the present invention.

The main computer 12 may be any computing device such as a network computer running Windows NT, Novel Netware, Unix, or any other network operating system or even a personal computer running any suitable operating program. The main computer 12 preferably includes a conventional monitor 18, a keyboard 20 or other input device, and at least one CPU 22. The computer 12 accesses internal or external memory and executes the computer program or programs of the present invention as described herein.

The computing device 14 may be a personal computer such as those manufactured and sold by Dell, Compaq, Gateway, or any other computer manufacturer, a handheld personal assistant such as those manufactured and sold by Palm or Pilot, or even an Internet appliance. In preferred forms, however, the computing device 14 is a laptop computer or other similar portable personal computer that may be easily carried to county courthouses for gathering property ownership data as described herein.

The communications network 16 may be any conventional communications network such as a local area network, a wide area network, a wireless network, the Internet or an intranet. The communications network 16 serves to link the main computer 12 with the computer 14 and any other computer devices used to implement the present invention.

The computer program or programs of the present invention are stored in or on computer-readable medium residing on or accessible by the main computer 12 for instructing the computers 12 and 14 to perform certain steps of the present invention as described herein. The computer programs preferably comprise an ordered listing of executable instructions for implementing logical functions in the main computer 12 and computing device 14. The computer programs can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium could include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

The flow charts of FIGS. 2 and 3 show the functionality and operation of a preferred implementation of the present invention in more detail. In this regard, some of the blocks of the flow charts may represent a module segment or portion of code of the computer programs of the present invention which comprises one or more executable instructions for implementing the specified logical function or functions. In some alternative implementations, the functions noted in the various blocks may occur out of the order depicted in FIGS. 2 and 3. For example, two blocks shown in succession in FIG. 2 may in fact be executed substantially concurrently, or the blocks may sometimes be executed in the reverse order depending upon the functionality involved.

A user wishing to implement the present invention first identifies a project area of interest as depicted by box 200 in FIG. 2. For example, a petroleum or pipeline company that wishes to perform routine maintenance and/or testing on a section of one of its pipelines initially identifies the particular section of pipeline and the geographic areas through which the pipeline runs. Before such maintenance or testing is performed, it is customary to notify all property owners through which the pipeline runs so that they are not surprised and/or inconvenienced when the maintenance is performed.

Ownership data for all properties through which the pipeline runs must then be initially gathered as depicted by box 202 of FIG. 2. Once the ownership data has been collected and stored, this step can be skipped for subsequent times that the same project area is identified.

In preferred forms, the ownership data consists of both textual data 24 and spatial data 26 depicted in FIG. 1. The textual ownership data represents certain attributes of each piece of property such as the property owner's name, address, and any other relevant contact information. The textual data may also include an indication of whether the property is rented or leased and may list any special features or conditions of the property such as buildings, lakes, streams, animals, etc. The spatial data represents the ownership boundaries of each property and may include, for example, polygon outlines showing the boundaries of each parcel of property.

The spatial and textual data may be gathered in a number of ways. For example, the ownership data may be gathered manually as described in the Description Of The Prior Art section of this application, above. However, the data is preferably obtained in digital format from the counties in which the properties are located so that it does not need to be manually re-entered into the computer programs of the present invention. Many counties and parishes have begun using ArcView based geographic information system (GIS) software programs to manage the way they store and present property ownership data. Such programs output the ownership data needed for the present invention in digital format, thus saving the time and expense of manually copying such data from paper documents.

The gathered ownership data, whether in digital format or paper format, is preferably initially gathered with laptop computers such as the computing device 14 in FIG. 1. Laptop computers can be taken to the various courthouses of interest so that the ownership data can be captured in the field. The ownership data from the laptops is then transferred to the database 28 where it is merged with ownership data obtained from other laptop computers.

Similarly, the laptop computers may be used to periodically update the ownership data by obtaining new ownership data from the various courthouses of interest. When this is done, the new ownership data is synchronized with the information in the database 28 so that any outdated ownership data is replaced with the new data.

Once the ownership data for the selected project area is initially gathered, it is then converted into a more usable format as depicted by box 204 of FIG. 2. If the data was manually gathered as described above, the spatial data is typed into an ArcView shapefiles program and the textual data is typed into Microsoft Access or any other conventional database program, such as an Oracle Sequel database program. If the ownership data was gathered digitally, the spatial data is converted to ArcView shapefiles and the textual data is converted to Microsoft Access, if necessary. If the digital data was already in these data formats, no conversion is necessary.

Once the textual ownership data 24 and spatial ownership data 26 have been gathered and converted, they are linked together as depicted by box 206 of FIG. 2 and stored in a database 28 such as a Microsoft Access database, depicted in FIG. 1. This permits both the spatial data and the textual data to be substantially simultaneously retrieved and displayed when using the present invention as described in more detail below. A TOBIN Land Suite program, which is commercially available, may be used to facilitate linking the spatial data with the textual data. The TOBIN Land Suite program provides a module called TOBIN Right-of-Way which provides tools to easily integrate the spatial and textual data. The Tobin Right-of-Way module also provides automated mechanisms for capturing the ownership data in the field and importing that data to a centralized database.

The textual ownership data and the spatial ownership data may be stored in separate files, but they may also be stored together in a single database 28 as depicted in FIG. 1 to reduce the complexity of managing the data. A GIS software product from Environmental Systems Research Institute (ESRI) called ArcSDE allows spatial objects to be stored in the same database as textual data, thus creating a geodatabase. Managing such data in geodatabase increases the availability and security of the data. ArcSDE can also used to improve access to the spatial data. Because the spatial data is converted into shape files as described above, additional time is required to create the shapefiles and additional memory space is used to store the files. Shapefiles are also limited in the way they can be used to perform spatial analyses. ArcSDE improves the performance of displaying spatial data by creating various spatial indices, distributing Global Information System (GIS) processing across several computers, and buffering data on the main computer 12 to send only pertinent data to the computer 14, rather than sending all the data across the network 16.

To graphically link the ownership data to the related asset, a graphical representation of the asset in the project area identified in box 200 must also be obtained as depicted by box 208 and as shown by the file 30 in FIG. 1. Although this step is shown after the steps described in association with boxes 200-206, the graphical representation of the asset may be obtained at any time.

The graphical representation of the asset may take many different forms. For example, if the asset is a pipeline, the graphical representation may be an aerial photograph of the pipeline or a line drawing representing the pipeline's centerline. Alternatively, the graphical representation may be obtained through TOBIN Land Grid. As described in more detail below, several different graphical representations of the asset may be gathered and simultaneously displayed to provide varying levels of detail. For example, an aerial photograph of an asset may be superimposed over a graphical representation of the centerline of the pipeline, or vice versa.

Once the ownership data and the graphical representation of the asset are obtained as described above, they are linked together as depicted by box 210 of FIG. 2. This creates a surface ownership map of the asset which both graphically represents the asset and links the graphical representation to ownership information relating to properties on which the asset is located. For example, the surface ownership map may illustrate a centerline of a pipeline asset that runs through a plurality of properties in a particular geographic area. A user may click-on a portion of the pipeline to display the ownership data for the property or properties through which this portion of the pipeline runs. This allows the user to simultaneously view a graphical representation of the asset while viewing relevant ownership data.

FIG. 3 is a flow diagram depicting exemplary functions or applications of the present invention. These functions and applications are provided by way of example only and are not meant to limit the use of the present invention in any way.

In one application, a surface ownership map created as described above may be used to simply view ownership data for a property or properties as depicted in box 300 of FIG. 3. Such ownership data may be used for any purpose such as contacting property owners about required maintenance on the asset or updating the ownership data. To view ownership data, a user simply clicks on a particular portion of the asset displayed on the surface ownership map to display all relevant ownership data for the property or properties on which that portion of the asset is located. Alternatively, the computer program or programs of the present invention allow the ownership data to be searched for without first accessing a surface ownership map.

The computer program or programs may also be used to create new projects as depicted in box 302 of FIG. 3. Such projects may include, for example, a project related to required maintenance on a section of pipeline.

The computer program or programs may also be used to create line lists as depicted in box 304 of FIG. 3. Line lists provide ownership data for all property owners, in succession, along a selected portion of a pipeline. A line list may be created by clicking on a starting point and an ending point of a pipeline depicted on a surface ownership map and then requesting the line list by, for example, clicking on a Line List tab or button adjacent the surface ownership map.

The computer program or programs may also be used to create mail-outs or other notices to be sent to affected property owners as depicted in box 306 of FIG. 3 and as shown by the file 32 of FIG. 1. For example, if a section of pipeline requires maintenance, a user can create a line list of all affected property owners as described above, and this line list can be used to send a maintenance notice to these property owners. Examples of documents that can be imaged and stored in the file 32 for later retrieval and mailing include right-of-way documents; facility/equipment specifications, schematics, and drawings; procedure documents; training documents; maintenance histories; inspection documents; and the above-described maintenance notices.

The above-described applications are just a few of the basic functions that can be performed with the present invention. These and other functions are described in more detail in connection with the screen displays of FIGS. 4-8.

Figure 4:
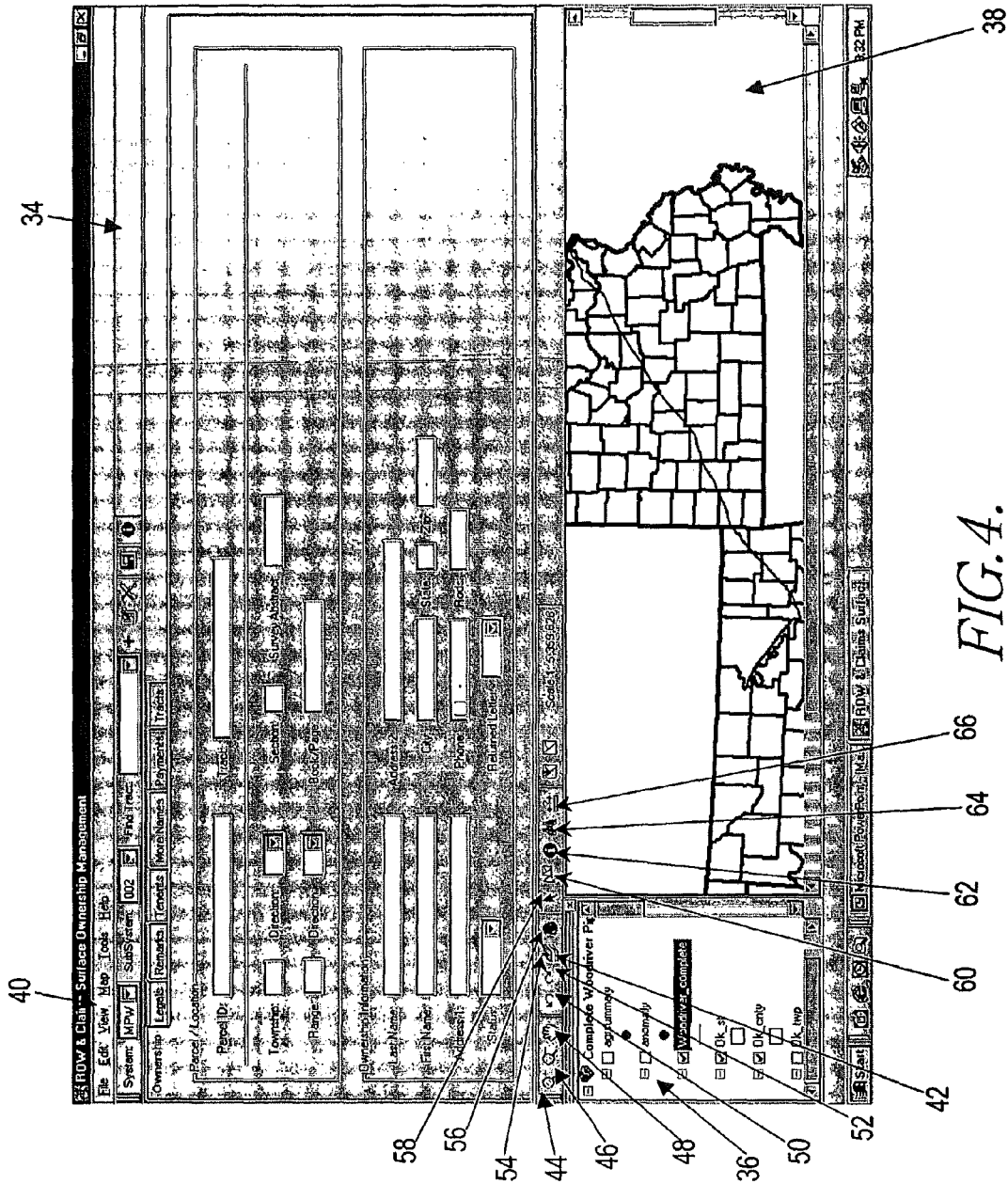
FIG. 4 is an exemplary screen display of a computer program which may be used to implement certain aspects of the present invention.

FIG. 4 is a screen display of the computer program or programs of the present invention which may be initially displayed when a user wishes to perform some of the functions of the invention described herein. The screen display consists of a top view element 34, a bottom left view element 36, and a bottom right view element 38.

The top view element 34 is the Data View. The Data View displays ownership data stored in the database 28 for a selected project area as described in more detail below.

The bottom left view element 36 is the Legend. The Legend displays different layers that can be selectively turned on and off of a surface ownership map. If the asset is a pipeline of a petroleum company, the Legend permits the display of the following layers: the centerline of the pipeline, an outline of the state or states that the pipeline crosses, an indication of the county boundaries for the states, an indication of the township boundaries for the states, section boundaries for the states, and property ownership boundaries for all properties that the pipeline crosses.

The bottom right view element 38 is the Map View. The Map View shows a surface ownership map for a particular asset, or portion thereof. Any of these three views can be turned on and off by clicking on a View icon 40 at the top of the screen and then selecting the appropriate view in a drop-down box or window.

A toolbar 42 is preferably presented or displayed between the Data View 34 and the other two view elements 36, 38. The tool bar includes:

- a Zoom-In icon 44 which may be clicked on to draw a square around a portion of the surface ownership map to zoom in on;
- a Zoom-Out icon 46 which may be clicked on to zoom out of a selected area in preset increments;
- a Pan icon 48 which may be clicked on to present a "hand" which can be moved over the surface ownership map and clicked to drag the map to a desired view;
- a Return Back icon 50 which may be clicked on to return a view to the previously displayed prior view;
- a Return to Former View icon 52 which may be clicked on to toggle forward to another view;
- a Zoom to a Layer icon 54 which may be clicked on to automatically zoom to an entire layer that is highlighted in the Legend;
- a Full Extent icon 56 which may be clicked on to display all of the layers of the surface ownership map;
- a Pointer icon 58 which changes the computer generated cursor to a pointer for permitting pointing at certain features on the surface ownership map;
- a Select icon 60 which allows a user to select a shape of or feature from a layer that has been selected from the Legend;
- an Identify icon 62 that may be clicked on to select a feature from a highlighted layer of the surface map, which then displays all textual ownership data associated with that feature;
- a Find icon 64 which may be clicked on to display a pop-up dialog box which prompts more information that may be typed in to search for a property by tract number or other i.d. and which then displays the results of the search; and
- a Measure Tool icon 66 which may be clicked on to allow a user to take measurements on a surface ownership map by, for example, clicking on a starting point and an ending point of an asset displayed on the map.

Figure 5:
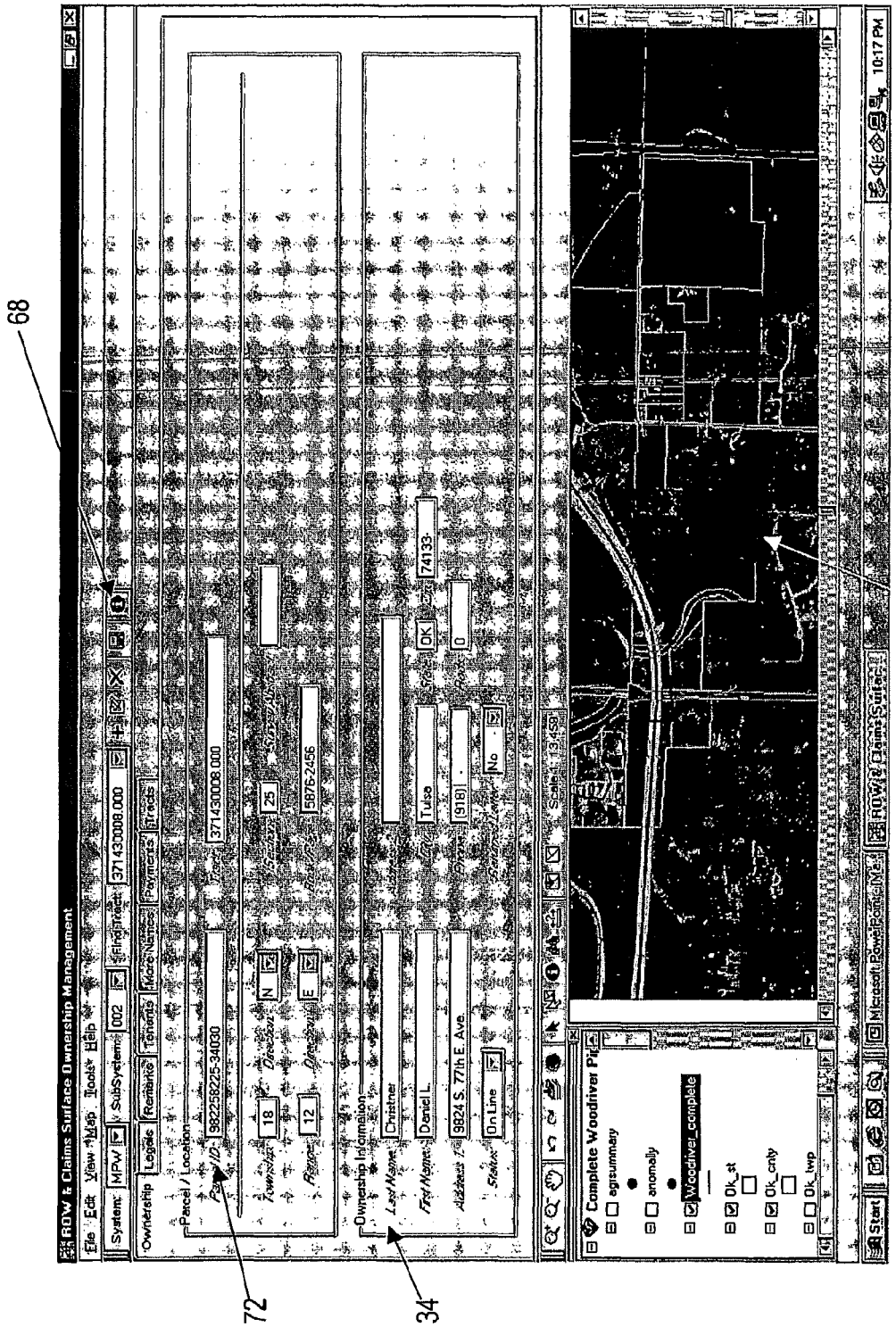
FIG. 5 is an exemplary screen display of a computer program which may be used to implement certain aspects of the present invention.

FIG. 5 illustrates a screen display of the computer program or programs of the present invention which permits a user to check for ownership data related to a particular property or properties on which an asset is located. To begin, a user clicks on an "i" icon 68 and then clicks inside a particular parcel or property polygon displayed on the surface ownership map for which the user wishes to obtain ownership data. The computer program then automatically highlights the selected parcel polygon with cross-hatches as depicted by 70. All ownership data for properties in the selected parcel are then displayed in the Data View 34. As shown, the Data View displays many different fields of information. One such field is the Parcel I.D. field 72, which is the number that the county assessor uses to maintain ownership information for the particular parcel. This number can be given to a county assessor when a user desires to update the ownership data for the parcel.

Figure 6:
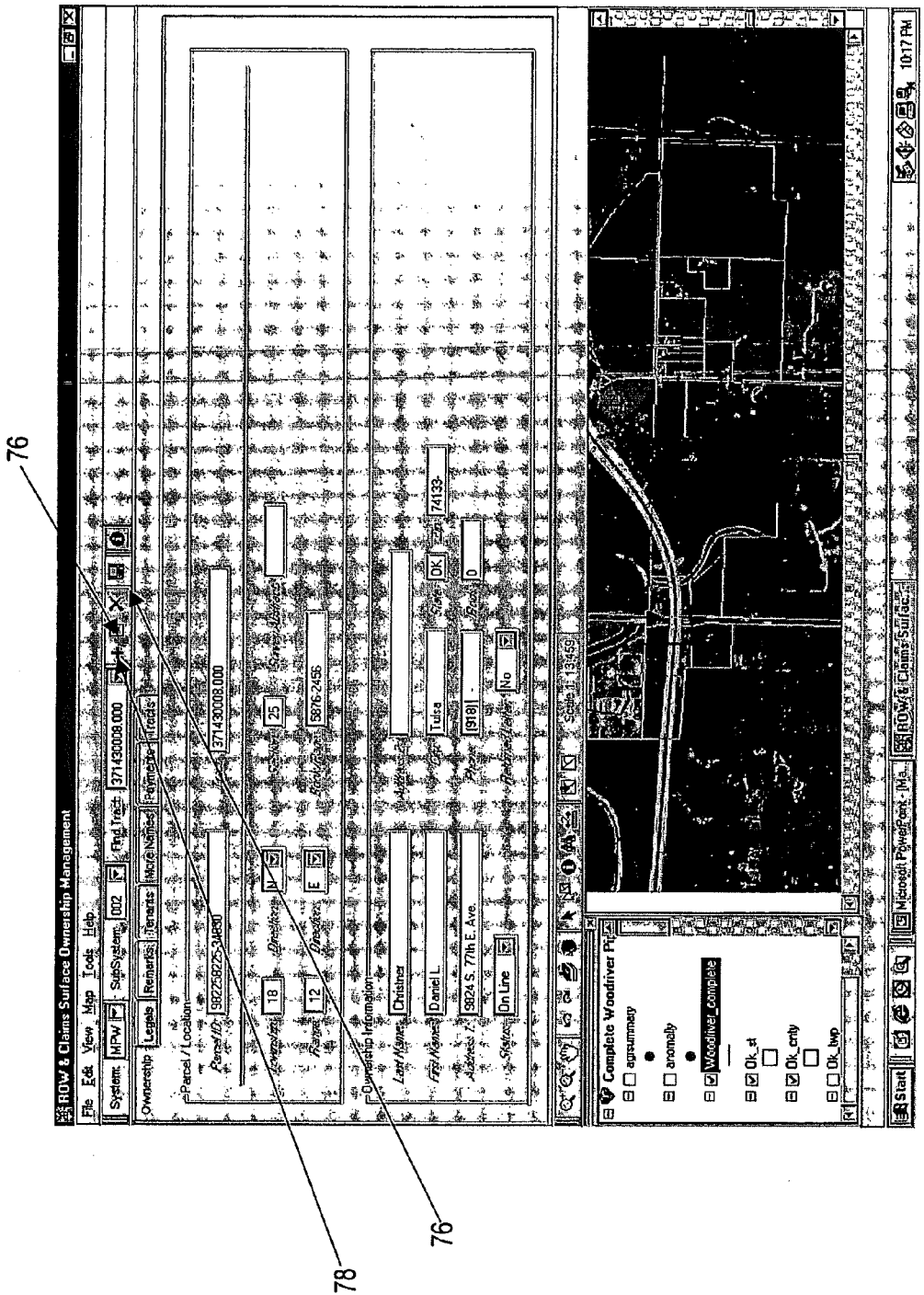
FIG. 6 is an exemplary screen display of a computer program which may be used to implement certain aspects of the present invention.

FIG. 6 illustrates a screen display of the computer program or programs of the present invention which permits a user to update ownership data stored in the database 28. To make a change to an existing record in the database 28, the user first clicks on an "Edit Record" button or icon 74. This activates all of the fields for the ownership data in the Data View 34 so that some or all of them can be changed. The user then simply enters all desired changes into the fields and then clicks on a "Save Changes" button or icon 76. A pop-up box then appears that confirms that the edits should be saved.

The screen display in FIG. 6 may also be used to add a new parcel to the surface ownership map. To add a new parcel, a user clicks on an "Add Parcel" button or icon 78. This activates all of the fields in the Data View 34 so that the new information can be entered into the view. Once all of the new information is added, the user simply clicks on the "Save Changes" button 76.

Figure 7:
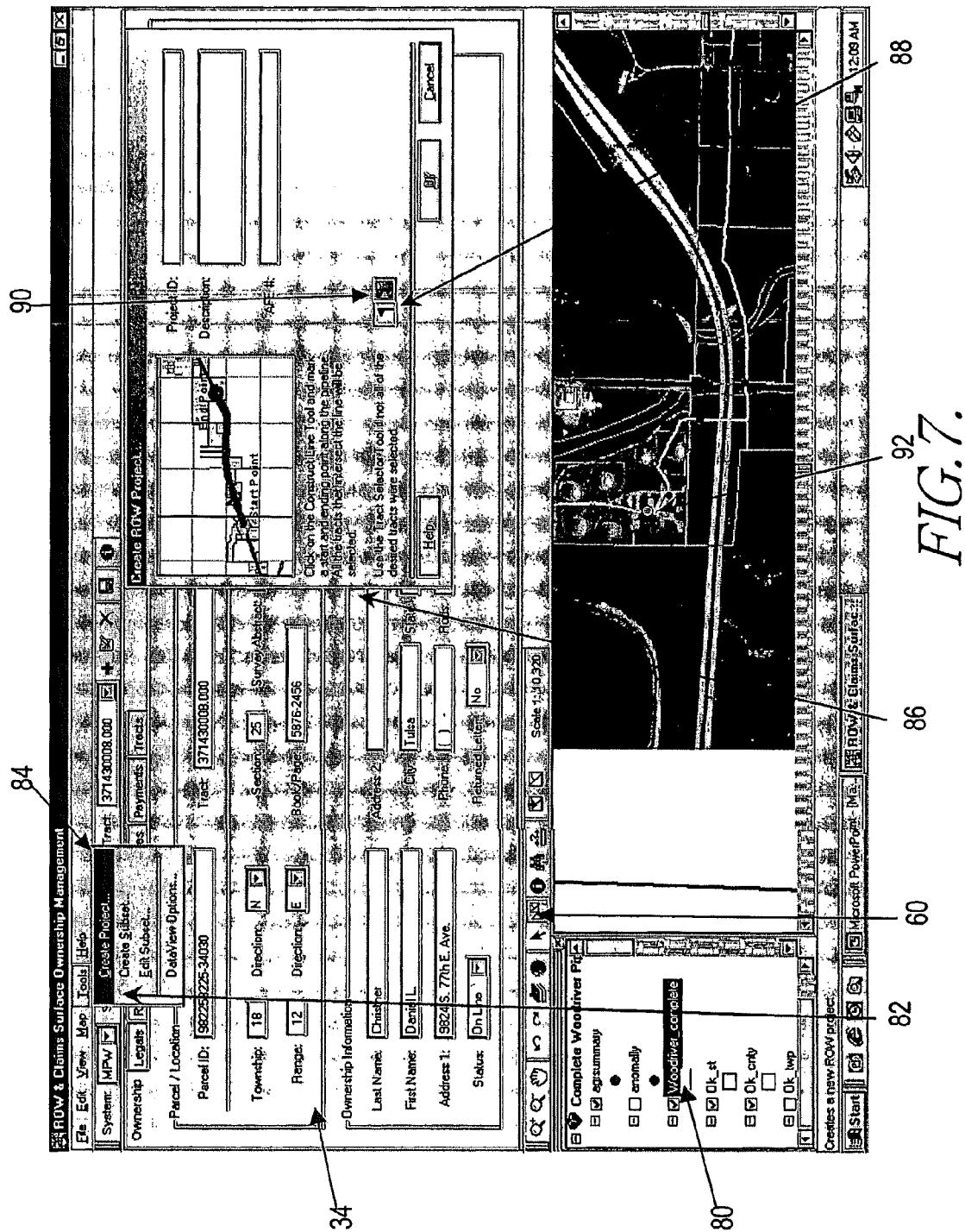
FIG. 7 is an exemplary screen display of a computer program which may be used to implement certain aspects of the present invention.

FIG. 7 illustrates a screen display of the computer program or programs of the present invention which may be used to create projects. To create a new project for a pipeline, a user first clicks on the pipeline centerline layer 80 of the surface ownership map to make it the active theme. The user then clicks on the Select button or icon 60 and selects the pipeline by drawing a rectangle across it. Once the pipeline has been selected, it is highlighted on the surface ownership map.

The user then may click on the Tools icon 82 and select a Create Project button 84 to display a Create ROW Project dialog box 86. Within the Create ROW Project dialog box, the user may click on a Construct Line Tool 88 and then place a dot on the starting point of the project and another button on the ending point of the project. This causes all property tracts that the line intersects to be selected for the project. If the user wishes to add additional tracts that were not previously highlighted, this can be done by using a Tract Selector tool 90 and drawing a rectangle 92 within the additional tracts that should be added. Tracts can also be deselected by holding the Shift key and drawing a rectangle through a highlighted tract. Once all of the desired tracts are added, a project i.d. and description of the project may be entered in the Data View 34.

Figure 8:
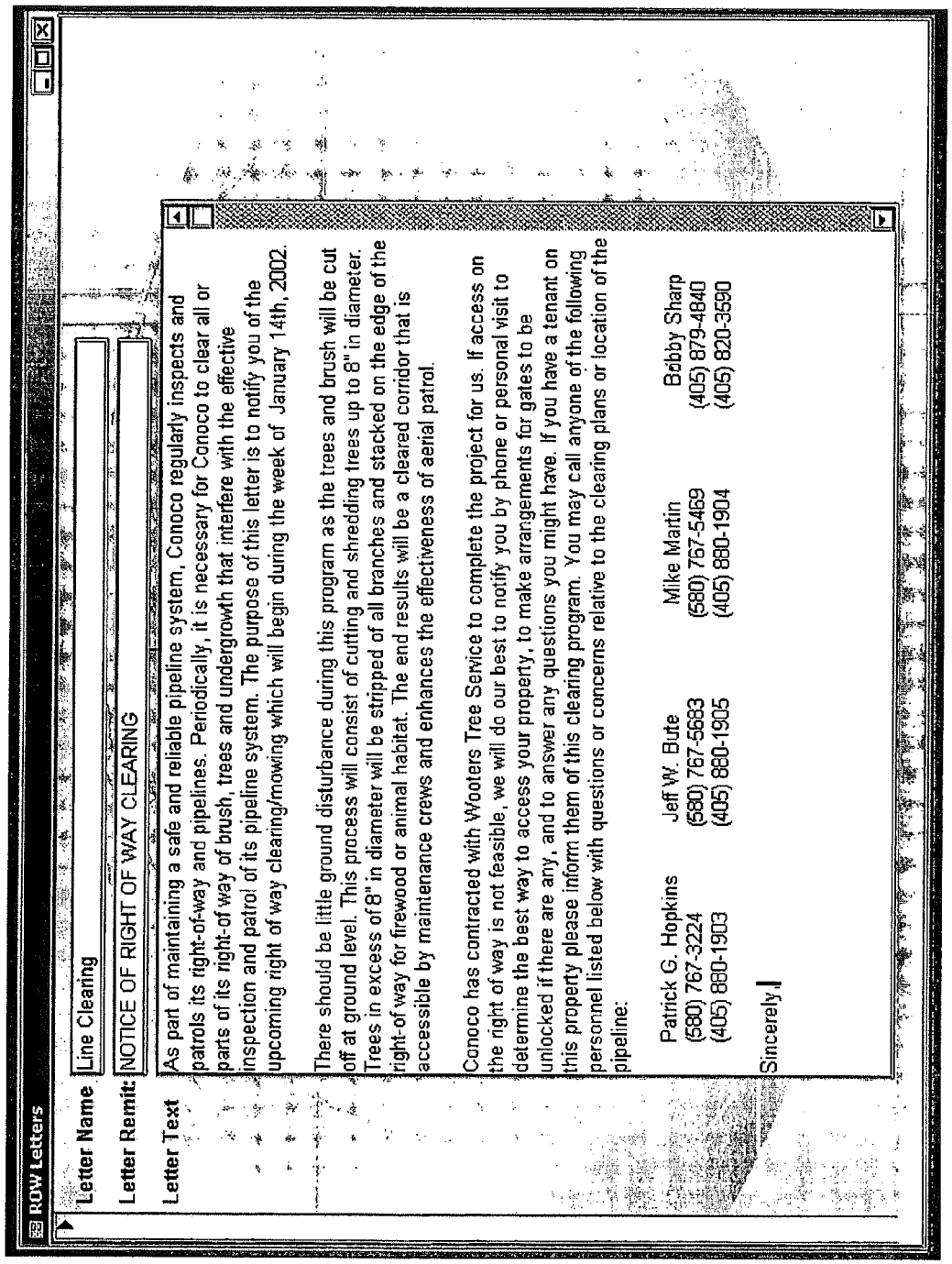
FIG. 8 is an exemplary screen display of a computer program which may be used to implement certain aspects of the present invention.

FIG. 8 illustrates a screen display of the computer program or programs of the present invention that may be used to create, edit and delete letters, notices, mail-outs, or other documents that may be sent to some or all of the property owners that are affected by events, such as maintenance of a pipeline that runs through the properties. Examples include: right-of-way documents; facility/equipment specifications, schematics, and drawings; procedure documents; training documents; maintenance histories; inspection documents; and the above-described maintenance notices.

The above-described screen displays illustrate just a few of the functions that can be performed with the computer program or programs of the present invention. Other functions can be added without departing from the scope of the present invention.

From the preceding description of preferred embodiments of the present invention, it can be seen that the system, method, and computer program of the present invention more effectively gathers and manages surface ownership data for properties in a geographic area on which an asset, such as a pipeline, is located. The invention reduces redundant data acquisition, permits the ownership data to be used for multiple purposes without re-gathering the data, stores and presents the data in a standardized format so that the data may be used for many different applications by many different users, and provides a graphical interface that is more intuitive and easy to use. The present invention also provides a method of gathering and maintaining ownership data that allows only those property owners who are actually affected by an event, such as maintenance of a pipeline, to be notified of the event.

Although the invention has been described with reference to the preferred embodiment illustrated in the attached drawing figures, it is noted that equivalents may be employed and substitutions made herein without departing from the scope of the invention as recited in the claims. For example, although the present invention is particularly useful for graphically representing pipelines and other assets and then tying these graphical representations back to a database or databases that contain ownership information for properties on which the assets are located, it can also be used for many other applications. For example, the present invention may also be used to graphically represent assets for risk management and for mediation efforts, emergency response where ownership information is critical, refinery/greenbelt and neighboring ownership mapping, and owner claim assessment and upstream gathering systems.

When used for emergency response, ownership data may need to be gathered for a wider area. For example, if the present invention is used to notify property owners of an emergency relating to a pipeline, ownership data may be gathered for all properties within a predetermined distance from the pipeline, such as a one-mile swath on either side of the pipeline, so that all property owners within that swath may be notified of some emergency related to the pipeline.

The following examples of certain embodiments of the invention are given. Each example is provided by way of explanation of the invention, one of many embodiments of the invention, and the following examples should not be read to limit, or define, the scope of the invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A computer-implemented method for managing ownership data for properties in a geographic area on which an asset is located and notifying owners of properties associated with a selected portion of the asset, said method comprising:

gathering and storing in computer memory the ownership data;

obtaining a graphical representation of the asset, wherein the asset is linear and passes through plurality of properties in the geographic area;

linking the ownership data with the graphical representation of the asset; displaying the graphical representation of the asset on a computer monitor;

selecting by a user part of the graphical representation of the asset to identify the selected portion; and retrieving from the memory the ownership data for the properties associated with the selected portion of the graphical representation of the asset located between two points along the asset as defined by the selected portion; and generating and sending a notice to all owners of the properties associated with the selected portion.

2. The method as set forth in claim 1, further comprising storing an imaged copy of the notice in the computer memory for later retrieval.

3. The method as set forth in claim 1, wherein the ownership data includes textual ownership data and spatial ownership data.

4. The method as set forth in claim 3, wherein the textual ownership data includes owner names, addresses and legal descriptions of the properties in the geographic area.

5. The method as set forth in claim 4, further comprising incorporating the textual ownership data into a database program.

6. The method as set forth in claim 3, wherein the spatial ownership data includes geographic boundary outlines for each of the properties in the geographic area.

7. The method as set forth in claim 3, further comprising converting the spatial ownership data to shape files and storing the shape files in the computer memory.

8. The method as set forth in claim 3, further comprising linking the spatial ownership data and the textual ownership data so that both may be retrieved substantially simultaneously from the computer memory.

9. The method as set forth in claim 1, further comprising superimposing the graphical representation of the asset over a graphical representation of the geographic area on which the asset is located.

10. The method as set forth in claim 9, wherein the graphical representation of the asset and the graphical representation of the geographic area on which the asset is located are obtained by aerial photography.

11. The method as set forth in claim 9, wherein the graphical representation of the asset is obtained by operational data related to the asset.

12. The method as set forth in claim 9, wherein the graphical representation of the geographic area on which the asset is located is obtained by land grid data.

13. The method as set forth in claim 1, further including the step of periodically obtaining current ownership data and storing it in the computer memory.

14. The method as set forth in claim 1, further comprising retrieving an imaged copy of the notice stored in the computer memory.

15. A computer-implemented method for managing ownership data for property in a geographic area on which an asset is located and notifying owners of properties associated with the asset, said method comprising:

gathering and storing in computer memory the ownership data;

obtaining a graphical representation of the asset, wherein the asset passes through plurality of properties in the geographic area;

linking the ownership data with the graphical representation of the asset;

displaying the graphical representation of the asset on a computer monitor;

generating and sending a notice to an owner of the property; and retrieving from the memory and displaying an imaged copy of the notice that was sent to the owner.

16. A computer executable program stored on computer-readable medium which when executed on a computer performs a method to manage ownership data for properties in a geographic area on which an asset is located and notify owners of properties associated with a selected portion of the asset, the method comprising:

receiving and storing in computer memory the ownership data; receiving and storing a graphical representation of the asset;

linking the ownership data in the memory with the graphical representation of the asset, wherein the asset is linear and passes through plurality of properties in the geographic area;

displaying the graphical representation of the asset on a computer monitor;

enabling a user to select part of the graphical representation of the asset to identify the selected portion;

retrieving from the memory and displaying the ownership data associated with the selected portion of the graphical representation of the asset located between two points along the asset as defined by the selected portion; and generating and sending a notice to all owners of the properties associated with the selected portion.

17. The computer program as set forth in claim 16, wherein the ownership data includes textual ownership data and spatial ownership data.

18. The computer program as set forth in claim 17, wherein the textual ownership data includes owner names, addresses, and legal descriptions of the properties in the geographic area.

19. The computer program as set forth in claim 17, wherein the spatial ownership data includes geographic boundary outlines for each of the properties in the geographic area.

20. The computer program as set forth in claim 16, further including a code segment for superimposing the graphical representation of the asset over a graphical representation of the geographic area on which the asset is located.

* * * * *